United States Patent
D'Souza

(10) Patent No.: US 12,411,691 B1
(45) Date of Patent: Sep. 9, 2025

(54) SYSTEM AND METHOD FOR COMPRESSING REGULAR DATA STREAMS USING INSTRUCTION CACHE-RESIDENT PERFECT HASH FUNCTIONS

(71) Applicant: AtomBeam Technologies Inc., Moraga, CA (US)

(72) Inventor: Julius D'Souza, New York, NY (US)

(73) Assignee: ATOMBEAM TECHNOLOGIES INC., Moraga, CA (US)

(*) Notice: Subject to any disclaimer, the term of this patent is extended or adjusted under 35 U.S.C. 154(b) by 0 days.

(21) Appl. No.: 19/070,411

(22) Filed: Mar. 4, 2025

(51) Int. Cl.
 *H03M 7/00* (2006.01)
 *G06F 9/30* (2018.01)
 *G06F 12/0875* (2016.01)

(52) U.S. Cl.
 CPC ...... *G06F 9/30178* (2013.01); *G06F 12/0875* (2013.01); *G06F 2212/452* (2013.01)

(58) Field of Classification Search
 CPC ............. G06F 9/30178; G06F 12/0875; G06F 2212/452
 USPC ..................................................... 341/50, 51
 See application file for complete search history.

(56) References Cited

U.S. PATENT DOCUMENTS

| | | | |
|---|---|---|---|
| 2016/0125315 A1* | 5/2016 | Biem | G06N 5/04 706/12 |
| 2024/0364359 A1* | 10/2024 | Cooper | G06F 21/554 |

\* cited by examiner

*Primary Examiner* — Jean B Jeanglaude
(74) *Attorney, Agent, or Firm* — Galvin Patent Law LLC; Brian R. Galvin

(57) ABSTRACT

A system and method for compressing regular data streams using instruction cache-resident perfect hash functions. The system employs machine learning to analyze regular data streams and generate optimized perfect hash functions that remain resident in CPU instruction cache during compression operations. Unlike traditional compression methods that store lookup tables in data cache, this approach transforms compression operations into executable instructions, enabling efficient processing while leaving data cache available for application data. The system comprises continuous monitoring of compression performance and data stream characteristics, automatically regenerating hash functions when significant changes are detected. The method encompasses analyzing data streams, generating hash function characteristics through machine learning, transforming these characteristics into optimized instructions, and deploying them in instruction cache for runtime compression operations. This approach improves compression performance for regular data streams by leveraging CPU cache hierarchy more efficiently than traditional lookup table-based methods.

13 Claims, 8 Drawing Sheets

SYSTEM AND METHOD FOR COMPRESSING REGULAR DATA STREAMS USING INSTRUCTION CACHE-RESIDENT PERFECT HASH FUNCTIONS

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of data compression, and more particularly compressing regular data streams using perfect hash functions stored in a central processing unit (CPU) instruction cache.

Discussion of the State of the Art

Data compression plays a critical role in modern computing systems, enabling efficient storage and transmission of information across networks and devices. Traditional compression techniques typically rely on lookup tables or dictionaries stored in data cache to perform encoding and decoding operations. These approaches, while effective for general-purpose compression, can suffer from performance degradation due to cache misses when the lookup tables compete with application data for limited data cache space.

For regular data streams, which exhibit stable statistical properties over time, conventional compression methods may not achieve optimal performance due to their reliance on generic lookup structures. Regular data streams are commonly encountered in various computing applications, including database systems, transaction processing, and telemetry data collection. These streams are characterized by consistent probability distributions of values and predictable patterns that remain stable throughout the stream's lifetime.

Existing approaches to compressing regular data streams typically employ adaptive coding techniques that continuously update encoding tables based on observed data patterns. However, this adaptation process introduces computational overhead and may not fully exploit the predictable nature of regular data streams. Additionally, the storage of these encoding tables in data cache can lead to cache pollution, where frequently accessed application data is evicted to accommodate the compression lookup structures.

Some attempts have been made to optimize compression for specific types of regular data by pre-computing static encoding tables. However, these solutions still rely on data cache storage and do not address the fundamental inefficiency of using valuable data cache space for lookup operations that could be more efficiently implemented through other means.

Machine learning techniques have been applied to various aspects of data compression, primarily focusing on pattern recognition and adaptive coding. However, the potential for machine learning to optimize the implementation of compression functions, particularly with respect to CPU cache utilization, remains largely unexplored.

What is needed is a system and methods for compressing regular data streams that can achieve higher performance by better utilizing CPU cache resources while maintaining compression efficiency.

SUMMARY OF THE INVENTION

Accordingly, the inventor has conceived and reduced to practice, a system and methods for compressing regular data streams using instruction cache-resident perfect hash functions. The system employs machine learning to analyze regular data streams and generate optimized perfect hash functions that remain resident in CPU instruction cache during compression operations. Unlike traditional compression methods that store lookup tables in data cache, this approach transforms compression operations into executable instructions, enabling efficient processing while leaving data cache available for application data. The system comprises continuous monitoring of compression performance and data stream characteristics, automatically regenerating hash functions when significant changes are detected. The method encompasses analyzing data streams, generating hash function characteristics through machine learning, transforming these characteristics into optimized instructions, and deploying them in instruction cache for runtime compression operations. This approach improves compression performance for regular data streams by leveraging CPU cache hierarchy more efficiently than traditional lookup table-based methods.

According to a preferred embodiment, a system for compression of regular data streams is disclosed, the system comprising: a computing device comprising: at least a memory and a processor; a machine learning-based compression platform comprising a first plurality of programming instructions stored in the memory and operable on the processor, wherein the first plurality of programming instructions, when operating on the processor, cause the computing device to: analyze a regular data stream to extract statistical features and temporal patterns; generate, using a machine learning model, characteristics of a perfect hash function optimized for instruction cache residency based on the analysis; transform the characteristics into executable instructions implementing the perfect hash function; store the executable instructions in an instruction cache of the processor; and compress subsequent data from the regular data stream by executing the perfect hash function from the instruction cache.is disclosed, comprising XXX.

According to another preferred embodiment, a method for compressing regular data streams is disclosed, comprising the steps of: generating, using a machine learning model, characteristics of a perfect hash function optimized for instruction cache residency based on analysis of a regular data stream; transforming the characteristics into executable instructions implementing the perfect hash function; storing the executable instructions in an instruction cache of a processor; and compressing subsequent data from the regular data stream by executing the perfect hash function from the instruction cache.

According to an aspect of an embodiment, generating the characteristics comprises: extracting statistical features from the regular data stream; analyzing temporal stability of the statistical features; training a neural network using the statistical features to generate the characteristics; and optimizing the characteristics based on instruction cache utilization constraints.

According to an aspect of an embodiment, transforming the characteristics comprises: selecting a base function template; generating an abstract syntax tree based on the characteristics; performing instruction-level optimizations including loop unrolling and vectorization; and optimizing register allocation and instruction ordering for cache efficiency.

According to an aspect of an embodiment, further comprising the steps of: monitoring performance metrics during compression operations; analyzing changes in data stream characteristics; retraining the machine learning model when changes exceed a threshold; and deploying a new perfect hash function based on the retraining According to an aspect of an embodiment, the regular data stream comprises data having a consistent probability distribution of values over time.

According to an aspect of an embodiment, the computing device is further caused to: extract feature vectors representing probability distributions of values in the regular data stream; validate temporal stability of the extracted features using time series analysis; train a neural network using the feature vectors to generate the perfect hash function characteristics; and optimize the characteristics based on instruction cache utilization constraints.

According to an aspect of an embodiment, the computing device is further caused to: select a base function template from a template library; generate an abstract syntax tree based on the perfect hash function characteristics; perform instruction-level optimizations including loop unrolling, vectorization, and branch elimination; and optimize register allocation and instruction ordering for cache efficiency.

According to an aspect of an embodiment, the computing device is further caused to: track cache hit rates and execution timing during compression operations; analyze statistical changes in data stream characteristics using kernel density estimation; trigger model retraining when detected changes exceed predefined thresholds; and perform atomic switchover to newly generated hash functions without disrupting ongoing operations.

According to an aspect of an embodiment, the computing device is further caused to: analyze the probability distribution using kernel density estimation; verify temporal stability using time series analysis; confirm predictable patterns enabling static encoding; and validate that the distribution remains constant throughout the stream's lifetime.

According to an aspect of an embodiment, the computing device is further caused to: receive compressed data from the regular data stream; load the perfect hash function from the instruction cache; execute the perfect hash function in reverse to map compressed values to original values; and output the decompressed data while maintaining the perfect hash function resident in the instruction cache.

BRIEF DESCRIPTION OF THE DRAWING FIGURES

DETAILED DESCRIPTION OF THE INVENTION

Figure 1:
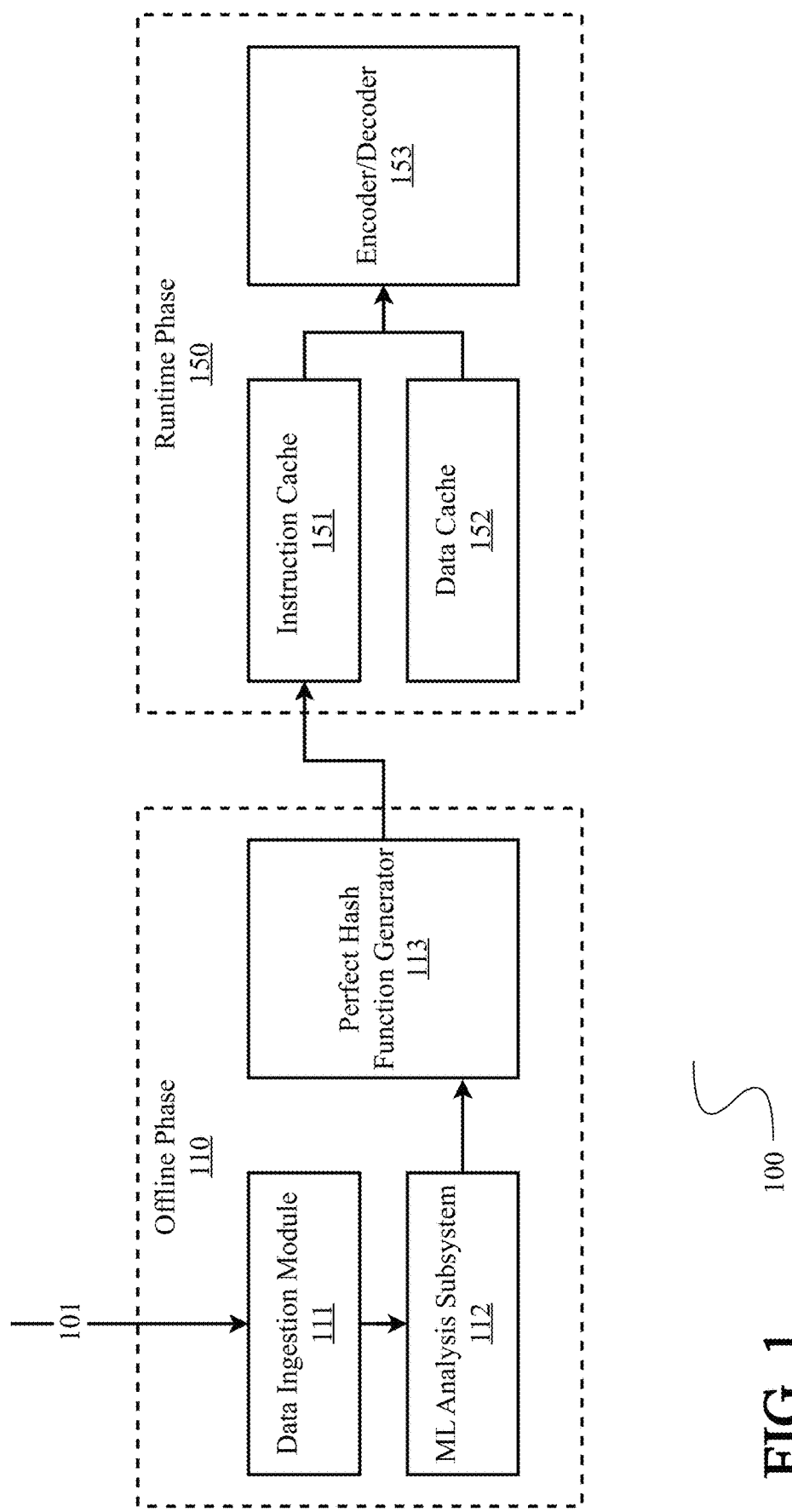
FIG. 1 is a block diagram illustrating an exemplary system architecture for providing compaction of regular data streams via static runtime functions, according to an embodiment.

The inventor has conceived, and reduced to practice, a system and methods for compressing regular data streams using instruction cache-resident perfect hash functions. The system employs machine learning to analyze regular data streams and generate optimized perfect hash functions that remain resident in CPU instruction cache during compression operations. Unlike traditional compression methods that store lookup tables in data cache, this approach transforms compression operations into executable instructions, enabling efficient processing while leaving data cache available for application data. The system comprises continuous monitoring of compression performance and data stream characteristics, automatically regenerating hash functions when significant changes are detected. The method encompasses analyzing data streams, generating hash function characteristics through machine learning, transforming these characteristics into optimized instructions, and deploying them in instruction cache for runtime compression operations. This approach improves compression performance for regular data streams by leveraging CPU cache hierarchy more efficiently than traditional lookup table-based methods.

The following are several distinct exemplary use cases for the instruction cache-resident perfect hash function compression system:

Database Transaction IDs: In high-throughput financial trading systems, each transaction generates a fixed-format identifier following specific patterns (e.g., timestamp+counter+source ID). These identifiers form a regular data stream with predictable characteristics. The system can compress these IDs for efficient storage while maintaining sub-microsecond lookup times critical for trade processing, leveraging the instruction cache optimization to handle millions of transactions per second.

IoT Sensor Networks: Industrial IoT deployments often use sensors that report measurements in fixed formats (e.g., temperature readings within known ranges, vibration measurements with specific patterns). The system can compress these regular sensor data streams at edge devices where cache efficiency is vital due to limited computing resources. This enables more efficient local storage and network transmission while maintaining real-time processing capabilities.

DNA Sequence Compression: Genomic data contains regular patterns of nucleotide sequences, particularly in known gene regions. When processing multiple samples of the same gene sequence, the variations follow predictable patterns. The system can compress these sequences using instruction cache-resident functions optimized for the specific gene region's characteristics, enabling faster processing of large-scale genomic datasets.

Network Packet Headers: In software-defined networking applications, network packet headers follow fixed formats with regular patterns based on routing rules. The system can compress these headers using perfect hash functions optimized for the specific network's routing patterns, enabling higher throughput packet processing while reducing memory bandwidth requirements.

Time-Series Data: In industrial control systems, time-series data from manufacturing equipment often follows regular patterns based on the manufacturing process cycles. The system can compress this data using instruction cache-resident functions specifically optimized for each type of equipment's characteristic patterns, enabling efficient storage while maintaining the quick access needed for real-time process control.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "regular data" refers to data streams exhibiting stable statistical properties over time, wherein the probability distribution of codewords remains substantially constant throughout the stream's lifetime. More specifically, regular data is characterized by a consistent probability of occurrence for each unique value or codeword in the data stream, temporal stability such that the statistical properties do not significantly vary across different time periods or segments of the data stream, and predictable patterns that enable efficient static encoding without requiring adaptive codebook updates. For example, a database system generating fixed-width transaction identifiers would produce regular data because the identifiers follow a consistent format and structure, the probability distribution of identifier values remains stable over time as new transactions are processed, the encoding scheme for these identifiers does not need to adapt since the format and distribution characteristics persist, and historical analysis of the identifier patterns reliably predicts future identifier characteristics, enabling optimization of static perfect hash functions for compression.

Conceptual Architecture

FIG. 1 is a block diagram illustrating an exemplary system architecture for providing compaction of regular data streams via static runtime functions, according to an embodiment. The perfect hash function system 100 comprises an offline phase 110 and a runtime phase 150 that work in conjunction to implement an optimized data stream compaction system. The offline phase 110 comprises a training data ingestion module 111 that receives and preprocesses representative data streams 101, preparing them for analysis by the machine learning subsystem 112. Training data ingestion module 111 performs data cleaning, normalization, and formatting operations to ensure consistent input quality for subsequent processing stages.

The machine learning subsystem 112 analyzes the preprocessed data streams using an ensemble of algorithms to identify patterns, validate stream regularity, and optimize hash function generation. ML subsystem 112 may employ kernel density estimation and Gaussian mixture models for statistical analysis, hierarchical density-based spatial clustering of applications with noise (HDBSCAN) clustering for pattern recognition, and long short-term memory (LSTM) networks with attention mechanisms for temporal stability validation. In some embodiments, a deep neural network architecture combining transformer and convolutional layers generates optimized hash function specifications based on the analyzed patterns.

The perfect hash function generator 113 receives specifications from the ML subsystem 112 and transforms them into executable instruction sequences. In some embodiments, generator 113 maintains a template library of base hash function implementations optimized for different CPU architectures and performs instruction-level optimizations including loop unrolling, vectorization, and branch elimination. The code synthesis process may utilize abstract syntax tree manipulation to generate optimal instruction sequences that maximize cache efficiency while maintaining the perfect hash property.

The runtime phase 150 executes the generated perfect hash functions within the CPU's instruction cache 151. According to an aspect, the instruction cache module 151 can be specifically optimized through genetic algorithms (or other algorithms) to maintain high cache hit rates and minimize latency. A data cache module 152 stores the input codewords separately from the hash functions, enabling parallel access to both instructions and data during compression operations. The separation of concerns between instruction and data caches represents a fundamental improvement over traditional lookup table-based approaches which can result in less cache misses and faster execution, enabling lower latency for encoding and decoding at runtime.

An encoder/decoder module 153 orchestrates the runtime compression operations by coordinating between instruction cache 151 and data cache 152 components. The module 153 can implement efficient pipeline operations that maximize throughput by minimizing cache misses and optimizing instruction execution order. Encoder/decoder 153 achieves superior performance through its ability to leverage both instruction and data cache hierarchies simultaneously, enabled by the perfect hash function approach.

In various embodiments, system 100 further comprises a monitoring and feedback subsystem that continuously evaluates runtime performance metrics including, but not limited to, cache hit rates, compression ratios, and latency measurements. These metrics can be stored in a performance database and can trigger automated regeneration of hash functions through offline phase 110 when significant changes in data stream characteristics are detected. This adaptive capability ensures the system maintains optimal performance as workload patterns evolve over time.

Furthermore, some implementations of system 100 comprise a configuration and control subsystem which provides interfaces for system administrators to tune performance parameters and initiate manual regeneration of hash functions when needed. The subsystem may comprise visualization capabilities for performance metrics and supports A/B testing of different hash function implementations to validate optimizations before deployment. This comprehensive management capability ensures the system can be effectively maintained and optimized in production environments.

In some embodiments, perfect hash function system 100 implements an interconnection framework that enables efficient communication and data flow between components. The training data ingestion module 111 can interface with external data sources through a standardized ETL (Extract, Transform, Load) pipeline that feeds preprocessed data streams directly into the machine learning subsystem 112. This interface may employ a streaming protocol that supports both batch and real-time data processing, ensuring ML subsystem 112 receives consistent, well-formatted input regardless of the source data characteristics.

The machine learning subsystem 112 maintains bidirectional communication with the perfect hash function generator 113 through a feedback optimization loop. As the ML subsystem 113 identifies patterns and generates hash function specifications, it receives performance metrics from the generator 113 regarding instruction efficiency and cache utilization. This feedback loop enables the ML algorithms to adaptively refine their specifications based on actual implementation outcomes, creating an iterative optimization process that converges toward optimal hash function implementations.

During runtime operations, the instruction cache 151 and data cache 152 modules may implement a coordinated prefetch mechanism managed by the encoder/decoder 153. This mechanism can predict access patterns based on historical execution traces and preemptively loads both hash function instructions and codeword data to minimize cache misses. According to an aspect, encoder/decoder 153 employs one or more pipeline scheduling algorithms that interleaves instruction and data cache accesses to maximize throughput while maintaining cache coherency.

In some implementations, a monitoring and feedback module implements publish-subscribe interfaces with all major system components, collecting telemetry data through lightweight instrumentation points. This telemetry data can flow into a performance database, which may employ a time-series optimization for efficient storage and retrieval of historical performance metrics. The database interfaces with both a configuration and control module and the ML subsystem 112, enabling data-driven optimization decisions based on long-term performance trends.

According to an aspect, the configuration and control module maintains administrative interfaces with all system components through a hierarchical control plane. This control plane enables fine-grained adjustment of component parameters while enforcing system-wide consistency constraints. The module can implement transaction management to ensure that configuration changes are applied atomically across all affected components, preventing inconsistent system states during updates.

According to an embodiment, to support the system's adaptive capabilities is a feedback path from runtime phase 150 back to offline phase 110. When a monitoring module detects significant changes in data stream characteristics or performance degradation, it triggers a regeneration workflow that flows through the ML subsystem 112 and hash function generator 113. This regeneration process occurs without disrupting ongoing compression operations through a version management system that enables atomic switchover to new hash function implementations.

Figure 2:
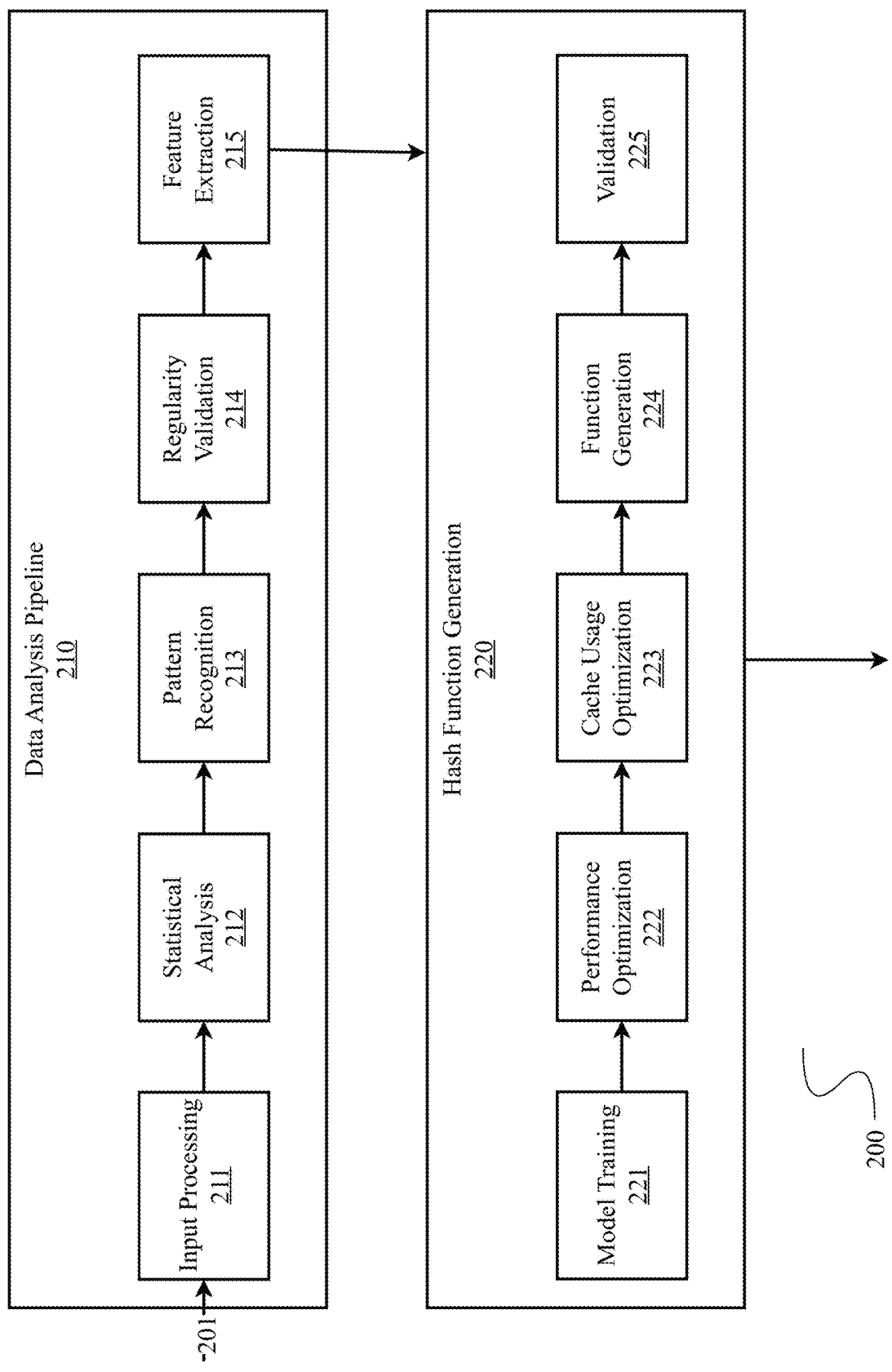
FIG. 2 is a block diagram illustrating an exemplary aspect of a perfect hash function compaction system, a ML analysis subsystem.

FIG. 2 is a block diagram illustrating an exemplary aspect of a perfect hash function compaction system, a ML analysis subsystem. According to the embodiment, the machine learning (ML) subsystem 200 comprises a data analysis pipeline 210 and a hash function generation pipeline 220 that work in conjunction to generate optimized perfect hash functions for regular data streams. The data analysis pipeline 210 comprises multiple processing stages that analyze input data characteristics and prepare features for the generation phase. In some aspects, subsystem 200 comprises functionality to perform offline phase 110 operations.

The data analysis pipeline 210 begins with an input processing component 211 that receives data streams 201 and performs initial preprocessing operations including, but not limited to, data cleaning, normalization, and formatting. The preprocessed data streams can be processed by a statistical analysis component 212 that employs probabilistic modeling techniques, such as maximum likelihood estimation and Bayesian inference, to analyze the distribution of values within the data stream.

A pattern recognition component 213 receives the statistical analysis output and employs clustering algorithms, such as k-means clustering or hierarchical clustering, to identify patterns in how values appear within the stream. The patterns may be validated by a regularity validation component 214 that analyzes temporal stability using time series analysis techniques, including, for example, moving averages and autocorrelation analysis, to confirm the stream exhibits regular characteristics suitable for static perfect hash function generation.

A feature extraction component 215 transforms the analyzed data into training features using dimensionality reduction techniques such as Principal Component Analysis (PCA) or t-SNE, preparing the data for hash function generation pipeline 220.

According to the embodiment, hash function generation pipeline 220 begins with a model training component 221 that implements various model training techniques to create and manage one or more models used herein. For instance, model training component 221 may implement supervised learning algorithms, such as neural networks or gradient boosting machines, to learn optimal hash function characteristics. The trained model outputs are processed by a performance optimization component 222 that employs reinforcement learning techniques (or other optimization methods in some aspects) to optimize the hash function implementation for runtime efficiency.

A cache optimization component 223 specifically focuses on instruction cache utilization, using, for example, genetic algorithms or simulated annealing to optimize the size and structure of generated functions. The optimized specifications are passed to a function generation component 224 that synthesizes actual hash function code using, for instance, template-based code generation and/or abstract syntax tree manipulation.

According to an aspect, function generation component 224 comprises a series of subcomponents that transform optimized hash function specifications into executable instruction sequences. The component may further comprise a template selection module that maintains a library of base function templates optimized for different CPU architectures and instruction sets. These templates can incorporate common perfect hash function patterns including, but not limited to, polynomial rolling hash implementations, FNV-1a hash variants, Jenkins one-at-a-time hash modifications, and multiplicative hash sequences.

An instruction optimization module may be present and configured to receive inputs from cache optimization component 223 and performs transformations on the selected template, including loop unrolling for sequential operations, vectorization of parallel computations, branch elimination through predication, and/or instruction reordering for pipeline optimization. The instruction optimization module works together with the template selection module to ensure the generated code maintains optimal cache utilization characteristics while maximizing runtime performance.

A code synthesis module may be present and configured to generate the final instruction sequence using, for instance, Abstract Syntax Tree (AST) manipulation to insert optimal bit manipulation sequences, implement modulo operations via bitwise AND, replace multiplication with shift-add sequences, and/or eliminate unnecessary register moves. Additionally, the code synthesis module may perform register allocation optimization to minimize register spills, maximize use of CPU registers, reduce stack frame overhead, and optimize immediate value loading.

In an exemplary function generation process, the template selection module first selects a base FNV-la hash template based on input requirements from the cache optimization component. The instruction optimization module then processes this template, unrolling the main hash loop and vectorizing operations where possible. The code synthesis module subsequently generates an AST incorporating a sequence of operations where the hash value is initialized with a prime number and then processed through a series of XOR operations and optimized multiplication sequences for each 4-byte (or other size) block of input data. These operations are specifically chosen to maximize instruction cache efficiency while maintaining the perfect hash property required for the compression system.

The final optimization passes convert this high-level representation into an instruction sequence specifically tailored for storage in L1 instruction cache. This instruction sequence represents the perfect hash function in its executable form, ready for runtime deployment in the compression system. The generated function maintains the statistical properties identified during the analysis phase while achieving optimal runtime performance through careful instruction selection and ordering.

Finally, a validation component 225 performs comprehensive testing of the generated hash functions, measuring metrics including, but not limited to, execution time, cache miss rates, and compression efficiency.

In an exemplary implementation, ML subsystem 200 processes a regular data stream containing fixed-width database record identifiers. The input processing component 211 normalizes the identifiers and the statistical analysis component 212 determines their probability distribution follows a uniform distribution. The pattern recognition component 213 identifies that values appear in sequential blocks, while the regularity validation component 214 confirms temporal stability.

The feature extraction component 215 generates training features capturing the sequential block patterns. The model training component 221 employs a neural network to learn optimal hash function characteristics based on the block patterns. The performance optimization component 222 uses reinforcement learning to minimize instruction count, while the cache optimization component 223 applies genetic algorithms to ensure the function fits within L1 instruction cache.

The function generation component 224 produces a perfect hash function implementation that uses, for example, bit manipulation operations to compute hash values based on the block patterns. The validation component 225 confirms the generated function achieves sub-microsecond lookup times with a 99.9% cache hit rate. This exemplary implementation demonstrates how ML subsystem 200 can automatically generate highly optimized perfect hash functions tailored to specific regular data stream characteristics.

ML subsystem 200 implements an ensemble of algorithms across its data analysis pipeline 210 and hash function generation pipeline 220. According to an aspect, within the statistical analysis component 212, a combination of kernel density estimation (KDE) and Gaussian mixture models (GMMs) analyze the probability distributions of data stream values. The KDE implementation uses adaptive bandwidth selection via Silverman's rule to automatically adjust to different data distributions, while the GMM employs the Expectation-Maximization algorithm with Bayesian Information Criterion (BIC) for model selection to determine the optimal number of components for modeling the data stream's probability distribution.

According to an aspect, pattern recognition component 213 utilizes a hierarchical density-based spatial clustering algorithm (HDBSCAN) to identify patterns in the data stream, chosen for its ability to handle varying cluster densities and shapes without requiring a predefined number of clusters. This may be supplemented by a temporal convolutional network (TCN) that processes the sequential aspects of the data stream, capturing both short-term and long-term patterns through its dilated convolution architecture. The TCN may employ residual connections and layer normalization to maintain stable training dynamics.

According to an aspect, regularity validation component 214 implements a long short-term memory (LSTM) network architecture with attention mechanisms to analyze temporal stability. The LSTM network can use a bidirectional structure with 128 (for example) hidden units per direction, allowing it to capture both forward and backward temporal dependencies. The attention mechanism may employ scaled dot-product attention with multi-head attention layers (e.g., 8 heads) to identify relevant temporal patterns at different time scales. This may be complemented by a statistical change point detection algorithm using CUSUM (Cumulative Sum) control charts with adaptive thresholding to identify significant distribution shifts.

According to an aspect, model training component 221 employs a deep neural network architecture consisting of both transformer and convolutional layers. As a non-limiting example, the transformer portion uses 6 encoder layers with 8 attention heads each, while the convolutional portion uses residual blocks with 3×3 convolutions and batch normalization. The network can be trained using the Adam optimizer with a cosine annealing learning rate schedule and gradient clipping to prevent exploding gradients. According to an aspect, a bespoke loss function is implemented which combines cross-entropy loss for accuracy with a regularization term that penalizes instruction cache utilization, formulated as $L=CE+\lambda*cache\_penalty$, where $\lambda$ is dynamically adjusted during training.

According to an aspect, performance optimization component 222 implements a proximal policy optimization (PPO) reinforcement learning algorithm with a custom reward function that balances execution speed, cache utilization, and compression ratio. The PPO algorithm may use, for example, a dual architecture with separate policy and value networks, each implemented as deep neural networks with 4 hidden layers of 256 units each. The reward function can be formulated as $R=\alpha*execution\_speed+\beta*cache\_efficiency+\gamma*compression\_ratio$, where $\alpha$, $\beta$, and $\gamma$ are automatically tuned using Bayesian optimization with Gaussian processes.

According to an aspect, cache optimization component 223 employs a genetic algorithm with specialized mutation and crossover operators designed for instruction cache optimization. The genetic algorithm maintains a population of 100 (for example) candidates, using tournament selection with size 5 (for example) for parent selection. The mutation operators may comprise instruction reordering, instruction merging, and instruction splitting, while the crossover operator performs single-point crossover at basic block boundaries. The fitness function can incorporate both static analysis of instruction cache utilization and dynamic profiling results, weighted using an adaptive scheme based on observed runtime performance.

DETAILED DESCRIPTION OF EXEMPLARY ASPECTS

The methods and processes described herein are illustrative examples and should not be construed as limiting the scope or applicability of the perfect hash function compaction platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the perfect hash function compaction platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Figure 3:
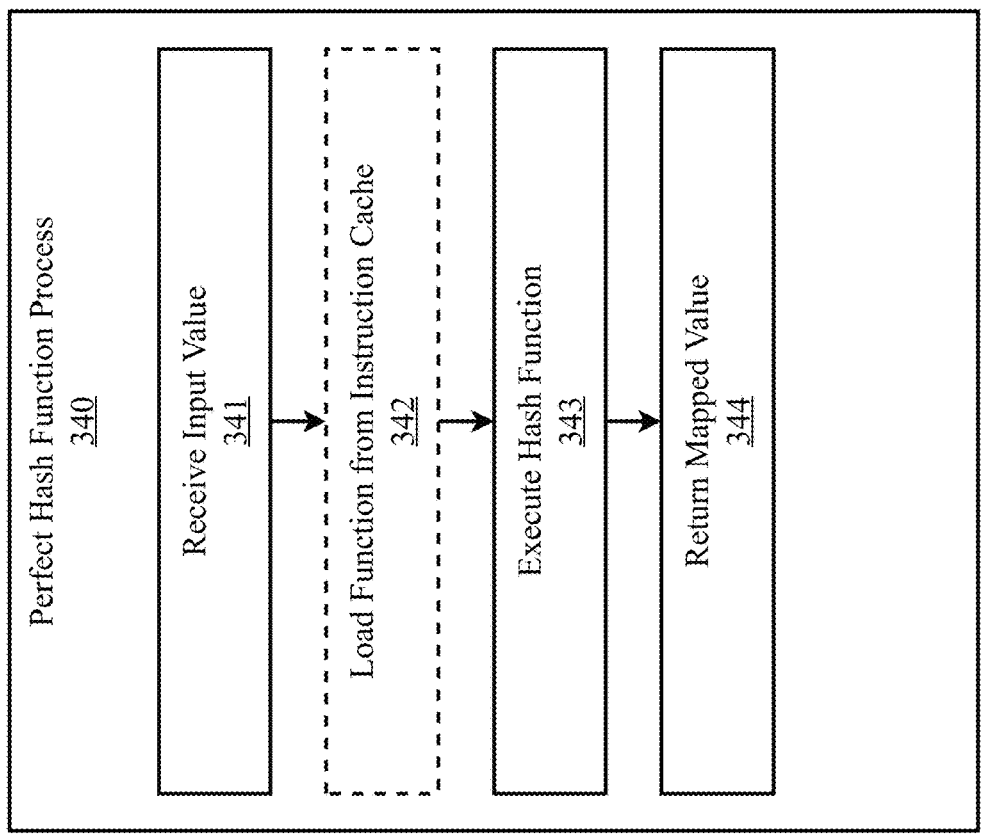
FIG. 3 is a runtime execution flow comparison diagram illustrating the operational differences between traditional lookup table approaches and the disclosed perfect hash function system.
Figure 3:
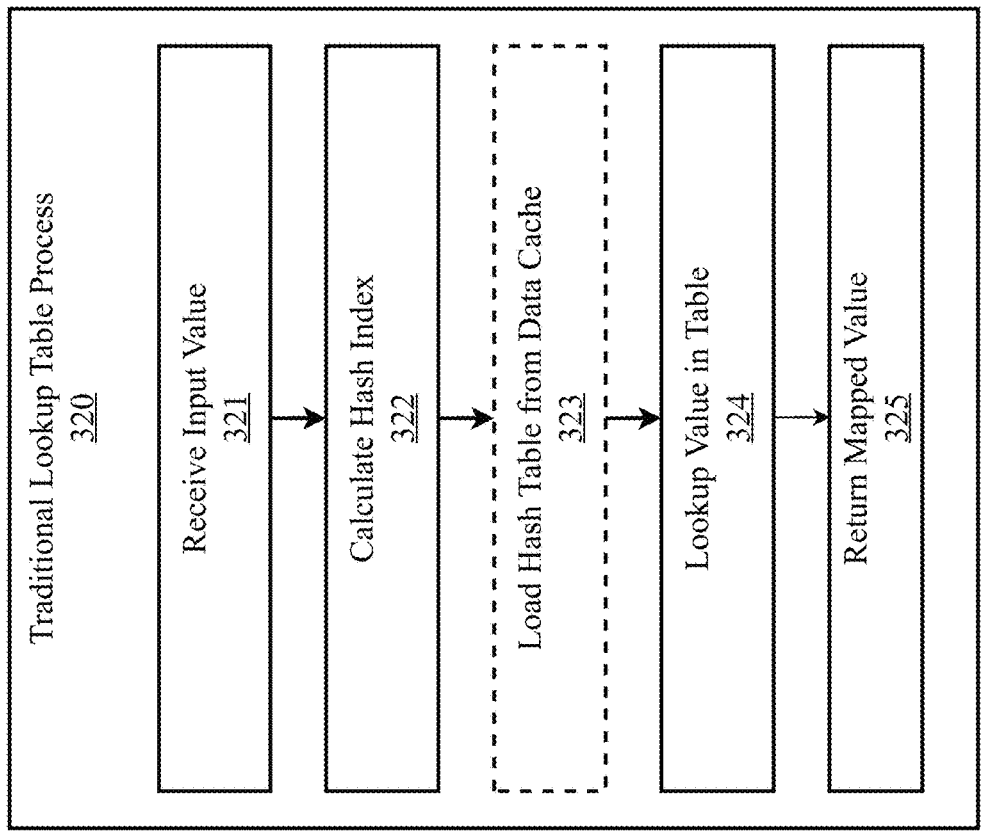

FIG. 3 is a runtime execution flow comparison diagram 300 illustrating the operational differences between traditional lookup table approaches and the disclosed perfect hash function system. The diagram 300 is bisected into two primary sections: a traditional lookup table process 320 displayed on the left side and a perfect hash function process 340 displayed on the right side.

The traditional lookup table approach 320 depicts a five-step process comprising: receiving an input value 321, calculating a hash index 322, loading a hash table from data cache 323, looking up the value in the table 324, and returning a mapped value 320. These process steps usually occur in data caches of a CPU. During the hash table loading step 323, the system typically encounters data cache access latency due to the size and structure of lookup tables. When the required data is not present in L1 data cache, the system must fetch from L2 or L3 cache, incurring significant performance penalties. These cache misses, indicated by the dashed box on 323, can result in stall cycles of 10-100 clock cycles for L2 access and 200-300 clock cycles for L3 access. Furthermore, lookup tables often span multiple cache lines, leading to potential prefetch inefficiencies and additional cache misses during value lookup step 318.

The perfect hash function approach section 340 illustrates a streamlined four-step process comprising: receiving an input value 341, loading the function from instruction cache 342, executing the hash function 343, and returning a mapped value 344. The instruction cache behavior, indicated by the dashed box on 342, demonstrates superior locality characteristics as the perfect hash function typically fits within a few cache lines and remains resident in L1 instruction cache during repeated executions. Modern CPU architectures maintain separate instruction and data caches, allowing the perfect hash function to remain hot in instruction cache while leaving the entire data cache available for application data. This separation eliminates cache pollution issues common in lookup table approaches where the tables compete with application data for data cache space.

The performance implications manifest in several key metrics. First, the instruction cache hit rate for the perfect hash function typically exceeds 99.9% after initial loading, as the function's instruction sequence remains static and heavily reused. Second, the reduction in data cache pressure can result in up to 30-40% improvement in overall application data cache hit rates. Third, the elimination of data-dependent lookups reduces branch mispredictions and improves CPU pipeline utilization. In practical implementations, these factors may combine to deliver 2-3× throughput improvements for compression operations compared to traditional lookup table approaches, with even higher gains in scenarios where data cache pressure is already high from application workload.

The comparative visualization 300 emphasizes the architectural efficiency achieved by replacing data cache lookups with instruction cache execution. This fundamental shift leverages the CPU's natural instruction streaming and prefetch capabilities while eliminating the data cache thrashing and lookup latency inherent in traditional implementations. The performance characteristics make this approach particularly well-suited for high-throughput compression operations on regular data streams where predictable, low-latency execution is critical.

Figure 4:
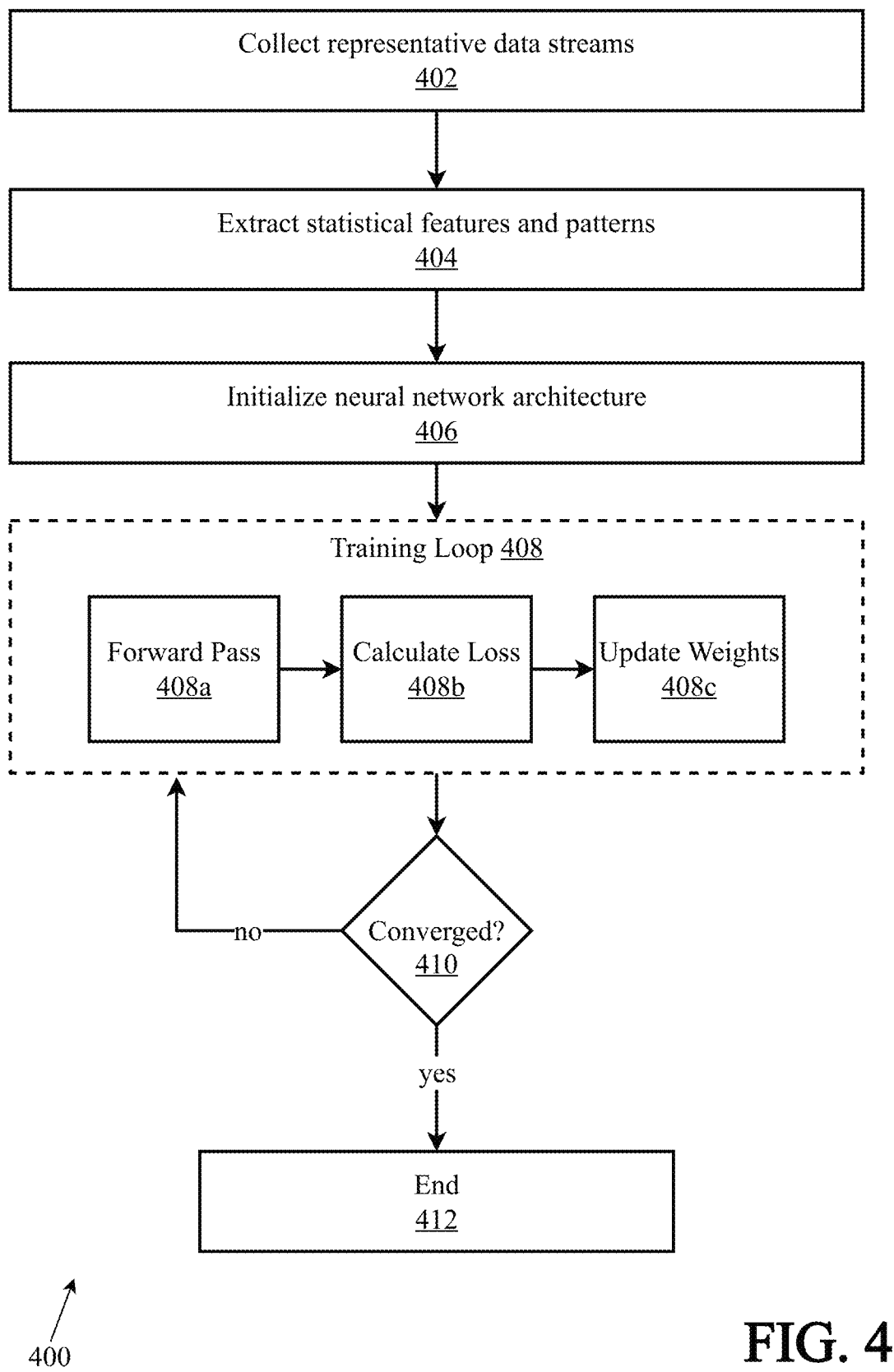
FIG. 4 is a flow diagram illustrating an exemplary model training process for generating optimal hash functions, according to an embodiment.

FIG. 4 is a flow diagram illustrating an exemplary model training process 400 for generating optimal hash functions, according to an embodiment. The diagram 400 depicts both the initialization phase and an iterative training loop that optimizes the hash function characteristics through machine learning. According to the embodiment, the process begins at step 402 with a data collection stage where representative data streams are collected for analysis. These data streams serve as the training basis for the model. The collected data streams may be preprocessed. Following data collection, the process moves to a feature extraction step 404 where statistical features and patterns are extracted from the collected data streams. This stage identifies key characteristics that will inform the hash function generation.

An initialization step 406 follows, where a neural network architecture is established with appropriate layers and initial weights. This architecture is specifically designed to learn and generate optimal hash function parameters based on the extracted features.

The process then enters a training loop 408, denoted by a dashed boundary, which comprises three primary operations. A forward pass operation 408a processes batches of input data through the neural network. The output of the forward pass feeds into a loss calculation operation 408b that evaluates the performance of the current model state against optimization objectives including cache utilization and execution efficiency. A weight update operation 408c then adjusts the neural network parameters based on the calculated loss using gradient descent techniques.

After each iteration of the training loop 408, the process flows to a convergence check 410, represented by a diamond-shaped decision node. If convergence criteria are not met, indicated by a "No" path, the process returns to the training loop 408 for further optimization. When convergence is achieved, indicated by a "Yes" path, the process proceeds to an end node 412, signifying the completion of the training process and the generation of optimized hash function characteristics.

The diagram emphasizes the iterative nature of the training process through its feedback loop structure, while maintaining clear separation between the initialization stages and the core training loop. This visualization supports the patent application by illustrating the systematic approach to generating instruction cache-optimized perfect hash functions through machine learning techniques.

The algorithms employed at each stage are carefully selected to optimize hash function generation. For instance, during feature extraction 404, the system may employ kernel density estimation (KDE) with adaptive bandwidth selection to analyze value distributions, while temporal convolutional networks (TCN) identify sequential patterns with dilated convolutions to capture both short and long-range dependencies. In some aspects, the neural network architecture initialization 406 establishes a hybrid structure combining transformer layers for pattern recognition and convolutional layers for feature processing, specifically configured with multiple (e.g., 2, 3, 5, 6, 10, etc.) transformer encoder layers (e.g., 8 attention heads each) and residual convolutional blocks 3×3 convolutions (e.g., 3×3) with batch normalization.

According to an embodiment, the convergence criteria 410 employs a multi-factor approach to determine optimal completion of the training process. Primary convergence factors can include, but are not limited to: relative improvement in loss function value falling below a threshold (e.g., $10^{-6}$) over 5 consecutive epochs; instruction cache utilization metrics stabilizing within a predetermined variance band (e.g., 1%); hash function execution latency achieving consistent sub-microsecond performance across test datasets; and collision probability maintaining zero across all validation sets. Secondary convergence factors may comprise gradient magnitude monitoring and model parameter stability metrics.

The optimization objectives driving the training process can be defined through a composite loss function that balances multiple performance criteria. For example, the primary term may implement cross-entropy loss for accuracy, while regularization terms penalize instruction cache utilization (L_cache=$\lambda_1$*cache_lines_used), execution complexity (L_exec=$\lambda_2$*instruction_count), and branch prediction impact (L_branch=$\lambda_3$*branch_count). The weighted coefficients $\lambda_1$, $\lambda_2$, and $\lambda_3$ can be dynamically adjusted using Bayesian optimization based on runtime performance metrics. Additionally, the optimization can include constraints ensuring the perfect hash property is maintained while minimizing the instruction footprint.

According to some embodiments, within the training loop 408, each iteration employs the Adam optimizer with a cosine annealing learning rate schedule (e.g., starting at $10^{-3}$ and decaying to $10^{-5}$). Gradient updates may be computed using mixed-precision training to accelerate convergence while maintaining numerical stability. The forward pass 408*a* may comprise automatic batching with dynamic batch sizes based on input data characteristics, while the loss calculation 408*c* employs importance sampling to prioritize challenging input patterns.

Figure 5:
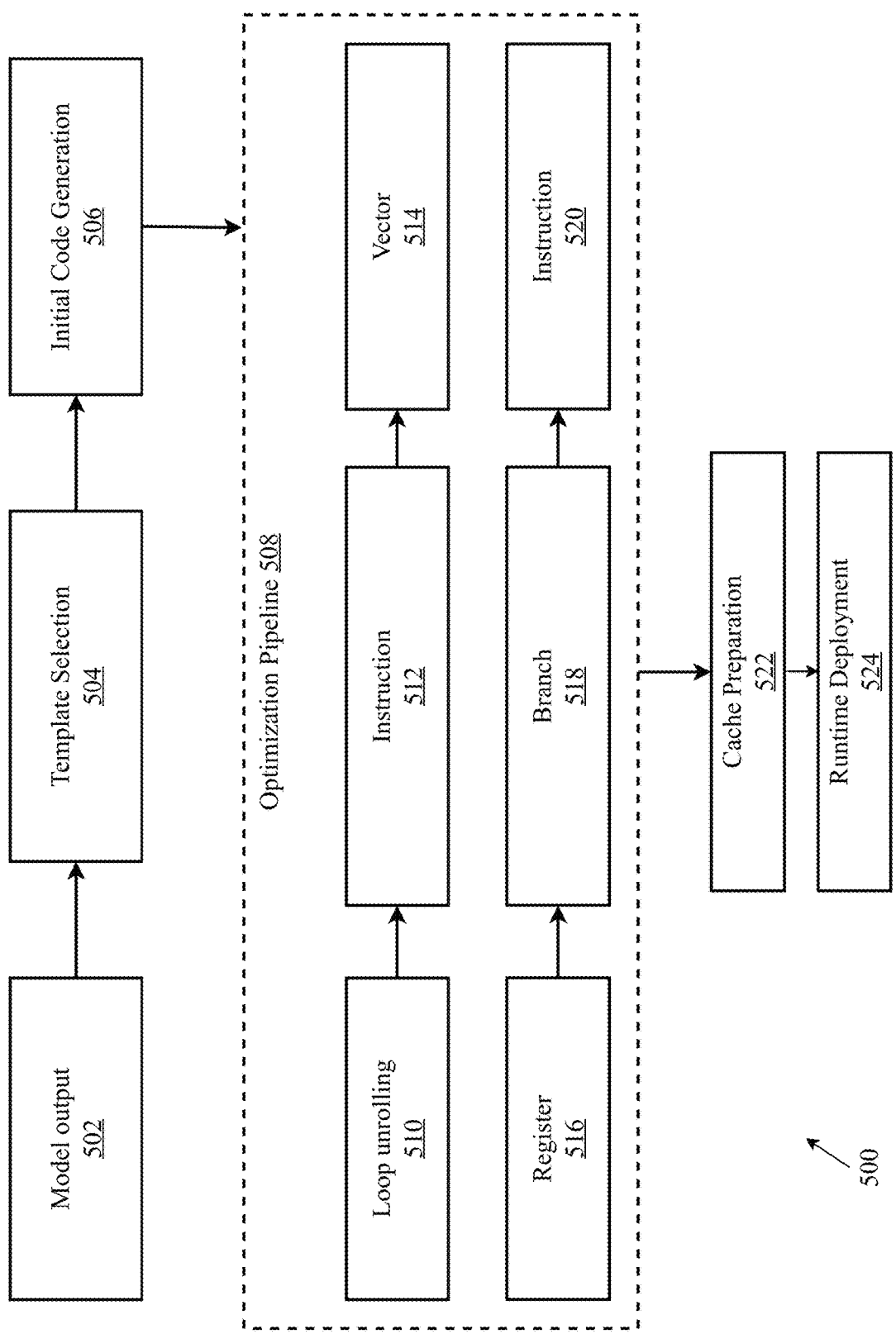
FIG. 5 is a flow diagram illustrating an exemplary method for the conversion of trained model output into an executable perfect hash function optimized for instruction cache deployment, according to an embodiment.

FIG. 5 is a flow diagram illustrating an exemplary method 500 for the conversion of trained model output into an executable perfect hash function optimized for instruction cache deployment, according to an embodiment. The process proceeds through multiple stages, each performing specific optimizations and transformations. According to the embodiment, the process begins at step 502 wherein the system receives the model output comprising optimized hash function characteristics from the trained neural network. These characteristics may comprise, but are not limited to, parameter specifications, computational patterns, and performance constraints. A template selection step 504 analyzes these characteristics to identify and select an appropriate base function pattern from a library of optimized templates. In some aspects, the base function may be selected by a model trained on a dataset comprising historical templates and hash function pairs as well as performance data. This selection is followed by an initial code generation step 506 that constructs an AST representation of the hash function based on the selected template and model parameters.

The optimization pipeline 508, denoted by a dashed boundary, encompasses six distinct optimization stages that transform the initial code representation. A loop unrolling optimization stage 510 identifies and expands iterative operations to reduce branch overhead. An instruction reordering stage 512 optimizes the sequence of operations for CPU pipeline efficiency. A vector operations stage 514 identifies opportunities for SIMD (Single Instruction, Multiple Data) optimization to enhance throughput.

The optimization pipeline 508 continues with a register allocation stage 516 that optimizes the use of CPU registers to minimize memory access. A branch elimination stage 518 employs predication and other techniques to reduce control flow complexity. An instruction cache analysis stage 520 evaluates the cache line utilization and alignment characteristics of the generated code.

Following the optimization pipeline, a cache preparation stage 522 performs instruction alignment and padding operations to optimize the function's layout within the instruction cache. This stage ensures proper cache line utilization and minimizes potential cache misses during execution. The process concludes with a runtime deployment stage 524 that handles the installation of the optimized function into the instruction cache and establishes necessary runtime linkages.

Component interactions throughout the process are managed through a series of intermediate representations, with each stage's output serving as input to the subsequent stage. The transformation process may maintain optimization constraints through metadata propagation, ensuring that cache utilization and performance requirements are preserved across all transformations. Dependencies between stages are carefully managed to ensure that optimizations in one stage do not negatively impact the optimizations of subsequent stages.

Figure 6:
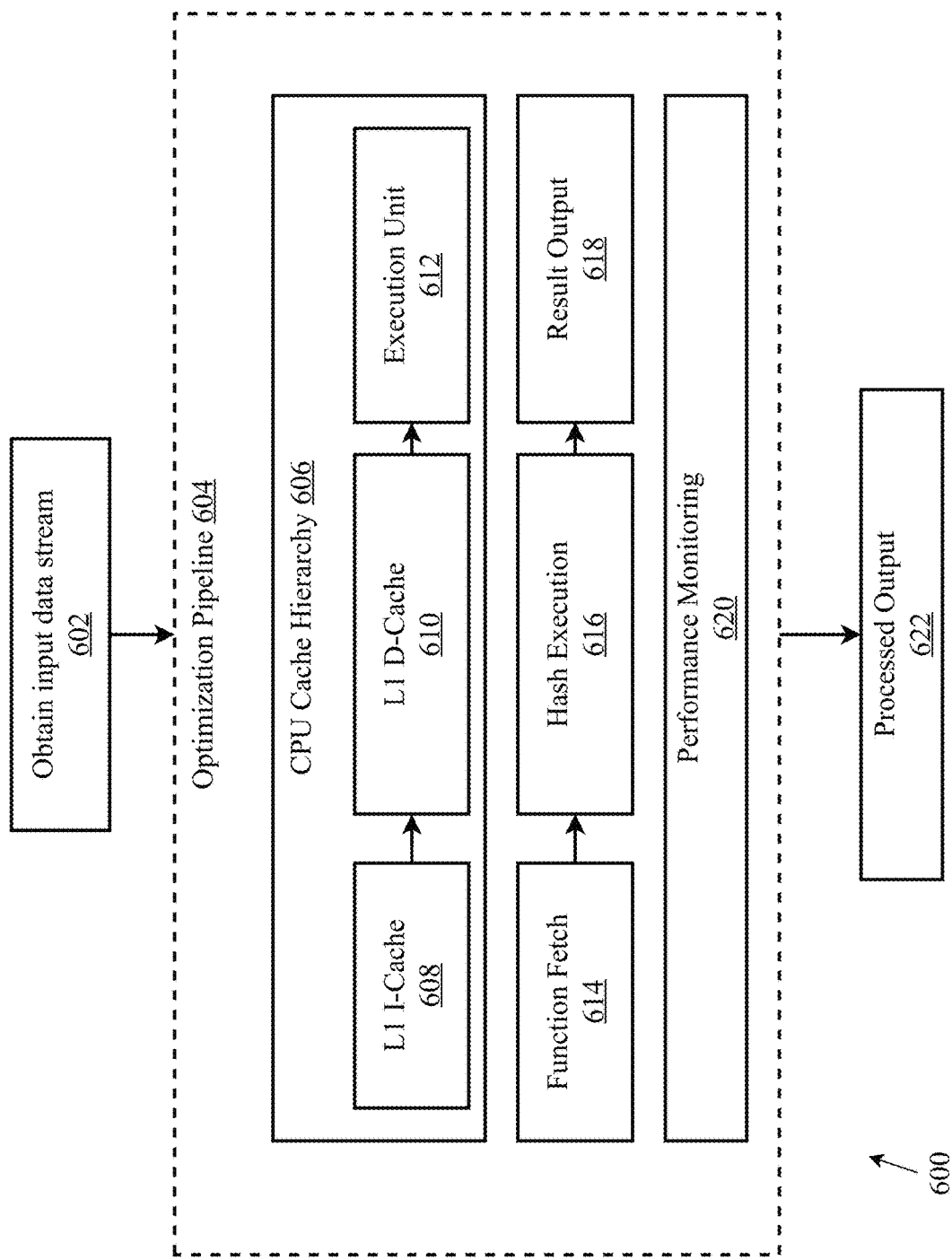
FIG. 6 is a flow diagram illustrating an exemplary method for runtime encoding and/or decoding through the perfect hash function system during execution, according to an embodiment.

FIG. 6 is a flow diagram illustrating an exemplary method 600 for runtime encoding and/or decoding through the perfect hash function system during execution, according to an embodiment. The process demonstrates how the system leverages instruction cache optimization for efficient data transformation operations. According to the embodiment, the process begins at step 602 where a regular data stream enters the system or is otherwise obtained by the system. This input data exhibits the consistent statistical properties and patterns that were used to optimize the perfect hash function during training. The data stream flows into a processing pipeline 604, denoted by a dashed boundary, which encompasses the core operational components.

Within the processing pipeline 604, a CPU cache hierarchy section 606 shows the interaction between critical hardware components. The L1 instruction cache 608 contains the optimized perfect hash function, while the L1 data cache 610 maintains the active working set of data being processed. An execution unit 612 coordinates the interaction between these cache components and performs the actual computation.

The processing stages are executed in sequence, beginning with a function fetch step 614 that retrieves the perfect hash function instructions from the L1 instruction cache 608. These instructions remain resident in the cache due to their optimized design and frequent reuse. A hash execution stage 616 performs the actual value mapping operations using the retrieved instructions, followed by a result output stage 618 that prepares the transformed data.

A performance monitoring component 620 continuously tracks system metrics including, but not limited to, cache hit rates, execution timing, and overall throughput. This monitoring enables real-time assessment of system efficiency and can trigger optimizations if performance degrades. The process concludes at an output stage 622 where the transformed data exits the system.

The diagram emphasizes the system's efficient use of the CPU cache hierarchy, with particular focus on maintaining the perfect hash function in instruction cache while processing data through the execution pipeline. This architecture and process combination enables high-throughput encoding and decoding operations while minimizing cache-related performance bottlenecks.

Figure 7:
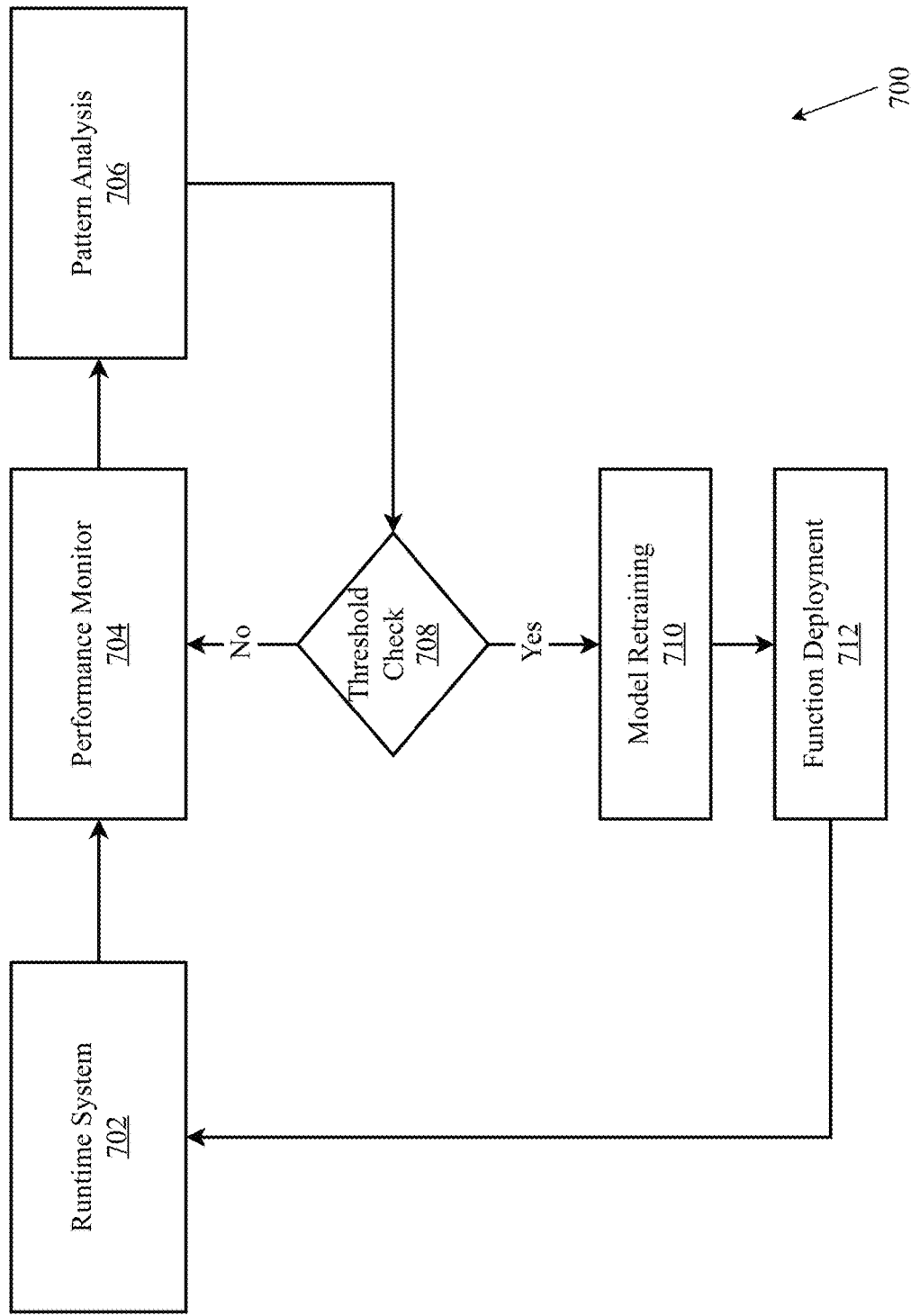
FIG. 7 is a flow diagram illustrating an exemplary method for adaptive monitoring process comprising a continuous feedback system that maintains optimal performance of the instruction cache-resident perfect hash function, according to an embodiment.

FIG. 7 is a flow diagram illustrating an exemplary method 700 for adaptive monitoring process comprising a continuous feedback system that maintains optimal performance of the instruction cache-resident perfect hash function, according to an embodiment. The process implements a systematic approach to detecting and responding to changes in regular data stream characteristics.

According to the embodiment, the process begins at step 702 with a runtime system module that maintains the active perfect hash function within the instruction cache during normal operation. This module interfaces directly with a performance monitor that continuously tracks key metrics including cache hit rates, execution timing, and pattern variations within the data stream at step 704. The performance monitoring operates with minimal overhead by leveraging existing CPU performance counters and lightweight instrumentation.

A pattern analysis module receives monitoring data and performs statistical evaluation of changes in the data stream characteristics at step 706. This analysis may comprise evaluation of value distribution shifts, temporal pattern changes, and deviations from expected regularities. The analysis results feed into a threshold check component that determines whether observed changes warrant hash function regeneration at 708.

When significant changes are detected, a model retraining module initiates the generation of a new perfect hash function optimized for the updated data characteristics at step 710. This module can leverage the same machine learning infrastructure used in initial function generation but focuses on incremental adaptation to the observed changes rather than complete retraining.

The process concludes with a function deployment module that manages the atomic switchover from the current hash function to the newly generated one at step 712. This deployment is performed without disrupting ongoing compression operations through a sophisticated version management system that ensures consistency during the transition. The new function is installed in the instruction cache and the system continues monitoring its performance, creating a continuous adaptation loop.

Exemplary Computing Environment

Figure 8:
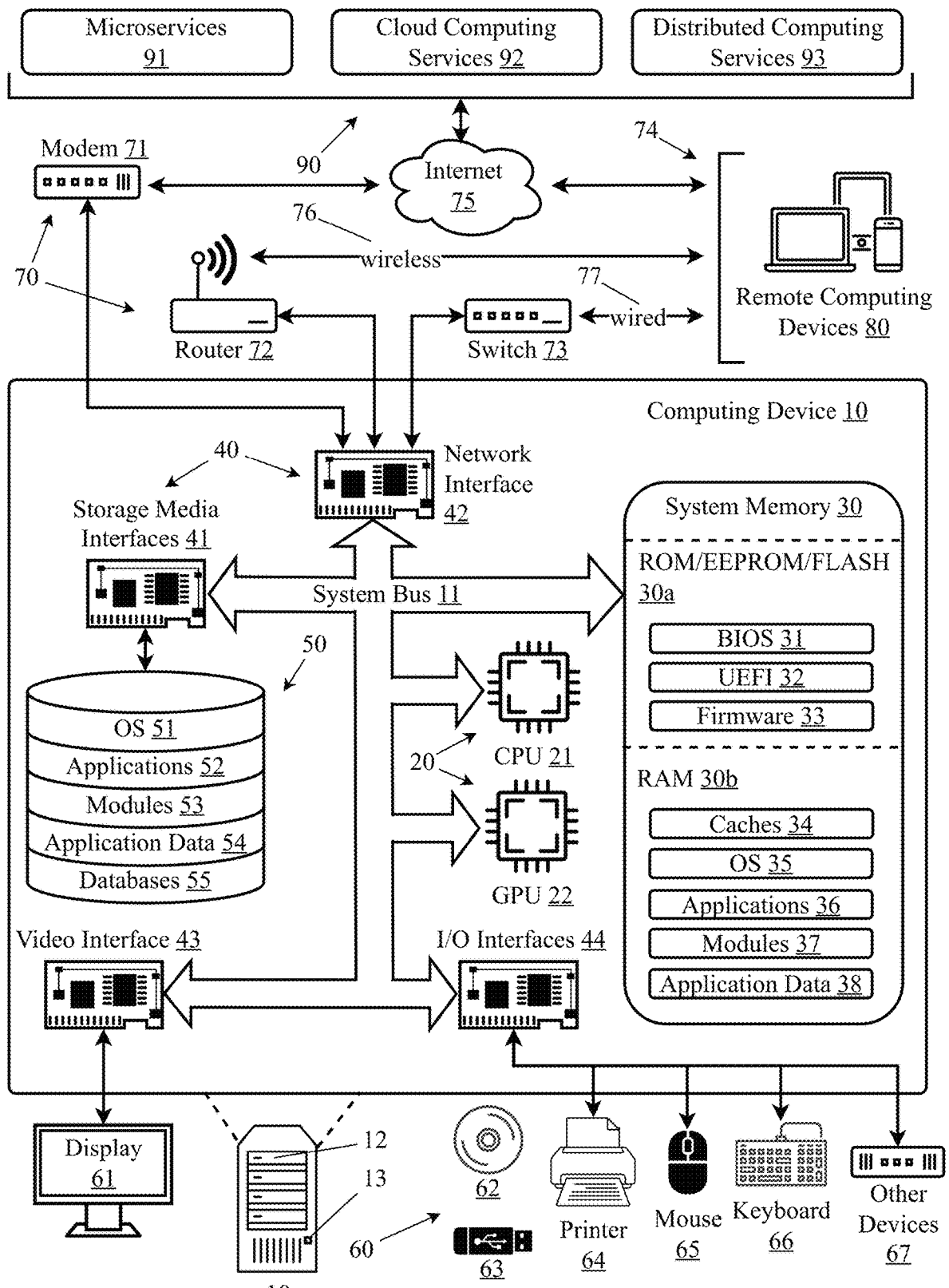
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A method for compressing regular data streams, comprising the steps of:
   generating, using a machine learning model, characteristics of a perfect hash function optimized for instruction cache residency based on analysis of a regular data stream;
   transforming the characteristics into executable instructions implementing the perfect hash function;
   storing the executable instructions in an instruction cache of a processor; and
   compressing subsequent data from the regular data stream by executing the perfect hash function from the instruction cache.

2. The method of claim 1, wherein generating the characteristics comprises:

extracting statistical features from the regular data stream;
analyzing temporal stability of the statistical features;
training a neural network using the statistical features to generate the characteristics; and
optimizing the characteristics based on instruction cache utilization constraints.

3. The method of claim 1, wherein transforming the characteristics comprises:
selecting a base function template;
generating an abstract syntax tree based on the characteristics;
performing instruction-level optimizations including loop unrolling and vectorization; and
optimizing register allocation and instruction ordering for cache efficiency.

4. The method of claim 1, further comprising the steps of:
monitoring performance metrics during compression operations;
analyzing changes in data stream characteristics;
retraining the machine learning model when changes exceed a threshold; and
deploying a new perfect hash function based on the retraining.

5. The method of claim 1, wherein the regular data stream comprises data having a consistent probability distribution of values over time.

6. The method of claim 1, further comprising the step of decompressing data by:
receiving compressed data from the regular data stream;
loading the perfect hash function from the instruction cache;
executing the perfect hash function in reverse to map compressed values to original values; and
outputting the decompressed data while maintaining the perfect hash function resident in the instruction cache.

7. A system for compression of regular data streams, comprising:
a computing device comprising at least a memory and a processor;
a machine learning-based compression platform comprising a first plurality of programming instructions stored in the memory and operable on the processor, wherein the first plurality of programming instructions, when operating on the processor, cause the computing device to:
analyze a regular data stream to extract statistical features and temporal patterns;
generate, using a machine learning model, characteristics of a perfect hash function optimized for instruction cache residency based on the analysis;
transform the characteristics into executable instructions implementing the perfect hash function;
store the executable instructions in an instruction cache of the processor; and
compress subsequent data from the regular data stream by executing the perfect hash function from the instruction cache.

8. The system of claim 7, wherein the computing device is further caused to:
extract feature vectors representing probability distributions of values in the regular data stream;
validate temporal stability of the extracted features using time series analysis;
train a neural network using the feature vectors to generate the perfect hash function characteristics; and
optimize the characteristics based on instruction cache utilization constraints.

9. The system of claim 7, wherein the computing device is further caused to:
select a base function template from a template library;
generate an abstract syntax tree based on the perfect hash function characteristics;
perform instruction-level optimizations including loop unrolling, vectorization, and branch elimination; and
optimize register allocation and instruction ordering for cache efficiency.

10. The system of claim 7, wherein the computing device is further caused to:
track cache hit rates and execution timing during compression operations;
analyze statistical changes in data stream characteristics using kernel density estimation;
trigger model retraining when detected changes exceed predefined thresholds; and
perform atomic switchover to newly generated hash functions without disrupting ongoing operations.

11. The system of claim 7, wherein the computing device is further caused to:
maintain the executable instructions in the instruction cache during repeated compression operations;
leave data cache available for application data;
process multiple data streams concurrently using the same perfect hash function; and
optimize cache line utilization through instruction alignment.

12. The system of claim 7, wherein the regular data stream comprises data having a consistent probability distribution of values over time, and wherein the computing device is further caused to:
analyze the probability distribution using kernel density estimation;
verify temporal stability using time series analysis;
confirm predictable patterns enabling static encoding; and
validate that the distribution remains constant throughout the stream's lifetime.

13. The system of claim 7, wherein the computing device is further caused to:
receive compressed data from the regular data stream;
load the perfect hash function from the instruction cache;
execute the perfect hash function in reverse to map compressed values to original values; and
output the decompressed data while maintaining the perfect hash function resident in the instruction cache.

* * * * *